2,990,387
STYRENE RESINS

Edward George Bobalek and Edward L. Brazet, Cleveland, Ohio, assignors to American Marietta Company, Arco Co. Division, Chicago, Ill., a corporation of Illinois
No Drawing. Filed Sept. 26, 1958, Ser. No. 763,460
11 Claims. (Cl. 260—23)

The present invention relates to non-gelled resinous products produced by modifying interpolymers of a styrene compound and drying oils or drying oil fatty acids with an epoxy resin to provide styrenated resins containing at least 10% by weight of epoxy resin.

An object of the present invention is to provide epoxy-modified styrenated resins which can be utilized in the formation of surface coatings and finishes exhibiting unexpected toughness and alkali resistance.

An additional object of the present invention is to provide a process for preparing epoxy modified styrenated resins employing drying oils and drying oil fatty acids whereby the resins produced provide superior films for appliance finishes and particularly provide improved film clarity on standing, improved film insolubility and improved resistance to water.

Another object of the present invention is to provide a resinous reaction product of a styrene compound, a drying oil or drying oil fatty acid and an epoxy resin.

The styrene compounds which are reacted with drying oils or drying oil fatty acids to produce the interpolymers which are modified with epoxy resins in accordance with the invention are those containing the phenyl group in combination with the vinyl radical. The phenyl group may be substituted with such groups as methyl, trichloromethyl, fluorine, hydroxy and chlorine, while the vinyl group may likewise be substituted by alkyl groups. For example, such styrene compounds as styrene per se, alpha-methyl styrene, meta-chlorostyrene, ortho- and meta-hydroxy-styrene may be used. Styrene per se is preferred.

Epoxy or epoxide resins are in general operable in the processes of the present invention. Preferred epoxy resins are those formed from the condensation under alkaline conditions of chlorohydrins and polyol phenols as major constituents. Also included are the completely hydrolyzed reaction products of such resins. Commercially prepared epoxy resins, such as the Epons (Shell Chemical Corporation), p,p'-isopropylidenediphenol (bisphenol A) epichlorohydrin alkaline condensates are very satisfactory. Among these Epon resins are Epon No. 1001, 1004 and 1007. Epon resin No. 1004 is a p,p'-isopropylidenediphenol-epichlorohydrin alkaline condensate having a molecular weight of approximately 1400–2000, whereas the Epon resins No. 1001 and 1007 are also p,p'-isopropylidenediphenol-epichlorohydrin alkaline condensates having lower and higher molecular weights, respectively. Higher or lower melting polymeric epoxy ethers of bisphenol can be utilized, if desired, so long as there are esterifiable hydroxyl groups available. Polyglycidyl ethers of dihydric phenols (particularly bisphenols such as bisphenol A) having a 1,2-epoxy equivalency of about 2 and an hydroxyl value of at least about 0.32 are particularly preferred. Hydroxyl value is reported in equivalents per 100 grams of resin.

The drying oils and oil fatty acids employed in the present invention include a wide variety of natural and synthetic materials. Mixtures of drying oils, of oils with acids, or of oil fatty acids are operative. Such materials as dehydrated castor oil, linseed oil, soya oil, linseed oil fatty acids, conjugated linseed oil, conjugated linseed oil fatty acids, isomerized walnut oil, conjugated soya oil, dehydrated castor oil fatty acids and soya oil fatty acids are operable. Preferred embodiments include the dehydrated castor oil fatty acids and mixtures of dehydrated castor oil fatty acids and soya oil fatty acids.

The products and processes of the present invention have utility in the formation of surface films and coatings wherein toughness, adhesion, and solvent and alkali resistance are desirable characteristics. These novel compounds have especial utility in baking enamels, paints and related compositions.

In the process of the present invention, an interpolymer of the styrene compound and the drying oil or drying oil fatty acid is first formed and this interpolymer is subsequently reacted with the epoxy resin at elevated temperatures. Temperatures of up to 500° F. or more can be satisfactorily employed for periods of time of up to one or more hours, the precise time being experimentally determined by the desired acid value and viscosity of the styrenated ester of the fatty acid, or by the desired viscosity of the styrenated ester formed by ester interchange between the oil and epoxy resin. The resulting resinous product is a polymer wherein the epoxy-resin is linked through its free hydroxyl groups as an ester with the drying oil-styrene interpolymer. The reaction is conducted in the liquid phase in a medium which is preferably substantially anhydrous and the reaction is desirably continued until the acid value of the product is less than about 40.

Carbon dioxide or other conventional means may be used to remove the unreacted styrene and any water of reaction formed from the condensation of the carboxyl and hydroxyl groups in the esterification phase. The reaction can be conveniently terminated by adding cold xylene to the reaction mixture when the appropriate acid value and/or viscosity of the resinous product is reached.

The ratio in the reaction mixture of the styrene to drying oil or drying oil fatty acid to epoxy resin can be varied within relatively wide limits and, in general, from about 40 to about 85 percent of the reaction mixture is the styrene interpolymer with the drying oil or drying oil fatty acid, with the remainder being between about 60 and 15 percent epoxy resin. The drying oil or drying oil fatty acid is frequently used in slightly greater amount than the styrene compound. Reaction mixtures comprising 25 to 35 parts of styrene or other styrene compound and 35 to 45 parts of drying oil or drying oil fatty acid are entirely satisfactory. The interpolymers produced from said reaction mixtures are desirably reacted with from 20–30 parts of epoxy resin. Resinous epoxy-modified styrene resins containing an epoxy resin in an amount of at least 10 percent or more by weight are included in the present invention, although at least 15 percent of epoxy resin, and more preferably from 20–30 percent of the epoxy resin is combined with the styrene-drying oil or drying oil fatty acid interpolymer. Such amount of epoxy resin imparts unexpected properties to styrene resins, especially when compared with the conventional styrenated alkyds.

Reaction products of the present invention retain the air-drying advantages of the styrene-containing resins while at the same time exhibiting improved adhesion, film toughness and mar resistance. The novel epoxy-modified styrenated resins can be successfully utilized in baking finishes for industrial application where toughness and caustic resistance are important requisites.

The following examples illustrate the processes and compositions of the present invention and are not to be construed as limiting the same.

Example 1

In a reactor fitted with agitator, thermometer and reflux condenser, 3600 parts of dehydrated castor oil fatty acids, 2500 parts of monomeric styrene and 40 parts of cumene hydroperoxide were heated together. After about one hour, the temperature reached 222° F., at which time the reaction became exothermic. The temperature was controlled between 220° F.–240° F. for about one-half hour until the heat of reaction subsided. Heating was then resumed so as to maintain moderate reflux over a period of 9 to 10 hours. The maximum temperature attained was 346° F. (The preparation of this and similar styrene interpolymers is more fully disclosed in U.S. Patent 2,495,458).

To this styrene-oil fatty acid interpolymer was added 1860 parts of an epoxy resin (Epon 1001) formed from the alkaline condensation of epichlorohydrin with bisphenol A. After removal of the reflux condenser, the temperature was increased to 500° F. while blowing carbon dioxide through the reaction mixture to remove unreacted styrene and water of reaction. At the end of about one hour the acid value of the reaction product was less than 30, and 50 percent solutions of the resin in xylene had a viscosity of at least U—V on the Gardner-Holdt scale at 25° C. The reaction was checked by adding to the resinous interpolymer an equal weight of cold xylene. The 50 percent non-volatile resin solution had a Gardner-Holdt standard viscosity rating of Y—Z, a weight per gallon of 7.96 lbs., an acid value of 21–35, and a tolerated volume dilution of 200 percent with mineral spirits without clouding.

*Example 2*

Following the procedure of Example 1, the styrenated oil fatty acid interpolymer was reacted with an epoxy resin (Epon 1001) until the resulting resinous reaction product had an acid value of about 40 and a Gardner-Holdt viscosity rating of N—O in 50 percent xylene, the reaction again being checked by addition of cold xylene to the reaction mixture. Its volume-dilution tolerance to mineral spirits was 400 percent.

A portion of the styrenated epoxy resin thus obtained was incorporated in a conventional air-drying enamel formulation, the drier being adjusted to yield a through dry similar to that exhibited by a conventional styrenated alkyd resin (prepared by the interaction of an interpolymer of styrene and drying oil or drying oil fatty acid, a polyhydric alcohol and polybasic acid). The styrenated-epoxy reaction product was superior to the styrenated-alkyd in drying speed and the resulting surface coating exhibited greater resistance to gasoline.

A second portion of the styrenated epoxy resin was incorporated in a conventional low-bake paint and a film cast on a ⅜ inch steel plate and baked for one hour at a temperature of 170° F. The baked film exhibited appreciable gasoline resistance that continued to improve upon additional air-drying.

*Example 3*

Following the procedure of Example 1, a resinous reaction product was prepared having an acid value of 30 and a viscosity rating of U—V on the Gardner-Holdt scale in 50 percent xylene solution. Its volume-dilution tolerance to mineral spirits was 400 percent.

*Example 4*

Following the procedure of Example 1, a resinous interpolymer of styrene and conjugated linseed oil fatty acid was formed and subsequently reacted with an epoxy resin (Epon 1004) to yield an epoxy-modified styrenated resin reaction product.

*Example 5*

Following the procedure of Example 1, an interpolymer of styrene and a mixture of linseed oil and tung oil in the ratio of three parts of the former to one part of the latter was formed. About 4000 parts of this drying oil-styrene interpolymer was then reacted by ester interchange with 1000 parts of an epoxy resin (Epon 1001) for a period of about two hours. Unreacted styrene and any water of reaction were removed by blowing carbon dioxide through the batch. The reaction was then stopped by the addition of cold xylene to the resinous interpolymer.

The resins produced by the epoxy resin modification of styrene drying oils or drying oil fatty acids interpolymer are uniquely superior in important respects providing coatings having significantly superior physical and chemical characteristics and which provide superior appliance finishes as is demonstrated from the following comparison with different resins produced from the same starting materials but reacted together in a manner other than that required in the invention, e.g., the reverse sequence of steps.

| Preparation 1 | Preparation 2 |
| --- | --- |
| Styrene reacted with fatty acid prior to esterification with Epon 1004. | Styrene reacted with ester product of reaction of Epon 1004 and fatty acid. |

CHARGE

| | Parts by weight, Preparation 1 | Item | Parts by weight, Preparation 2 |
| --- | --- | --- | --- |
| (A) | 40 | Mixed fatty acids: 1 part of dehydrated castor oil fatty acids, 4 parts of soya fatty acids. | 40 |
| (B) | 30 | Styrene monomer | 30 |
| (C) | 29.4 | Epon 1004: pp'-isopropylidene-diphenol-epichlorhydrin alkaline condensate, molecular weight 1400. | 29.4 |
| (D) | 0.6 | Cumene hydroperoxide | 0.6 |

DESCRIPTION OF PROCEDURE

| | |
| --- | --- |
| Fatty acid (A) is heated to 290–300° F. Monomer (B) in which is dissolved catalyst (D) is added in ½ hour. Heating is continued under agitation for 9½ hours at 300–360° F. Then Epon 1004 (C) is added, the temperature raised to 500° F. over a 6 hour period during which time water of reaction is evolved. The reaction is checked by diluting with xylene to 50% solids yielding a viscosity of Z at 50% solids in xylene, U to V at 55% solids in xylene, acid number of 14 and a color of 6–7 on the Gardner scale. | Fatty acid (A) and Epon 1004 (C) are heated to 350° F. for 6 hours and condensed to viscosity A–B on the Gardner-Holdt scale at 50% solids in xylene, to color #5 on the Gardner scale and to acid #22, after which the reaction is checked with cold xylene to form 50% solids solution. Styrene monomer (B) containing catalyst (C) is added to the xylol solution at a temperature of 292–295° F., the reflux temperature of the xylene solution, the period of addition being ½ hour and the total time of heating at reflux being 5 hours. The viscosity at 55% solids in xylol is U–V on the Gardner scale, the color is 5. |

Application of coatings (1) and (2) to glass panel:

The coatings were knife coated at 50% solids in xylene to glass panels and air dried to provide a film on each panel, having a weight of 5 mgm. per square inch and a dry film thickness of about 1.2–1.5 mils.

Following are the characteristics of the films coated as indicated above:

| Film Preparation (1) | Film Preparation (2) |
| --- | --- |
| Clear after standing 1 week at 80° F. | Cloudy within 4–7 days at 80° F. |
| *Xylol Immersion Test* | *Xylol Immersion Test* |
| Film softened on immersion in xylol but did not lift; upon air drying film integrity maintained and film recovered. | Film softened and lifted immediately. |
| *Water Immersion Test* | *Water Immersion Test* |
| Film did not whiten after immersion in water for 24 hours at 80° F. | Film whitened after immersion in water at 80° F. for 24 hours. |

As will be evidenced from the foregoing, the epoxy-modified styrenated resins which are produced by esterifying a styrene drying oil or drying oil fatty acid interpolymer with an epoxy resin are uniquely superior with respect to film clarity, xylol resistance and water resistivity which are significant technical criteria for distinguishing and screening satisfactory coatings from unsatisfactory coatings in the appliance finishing field.

Various modifications may be made in the invention without departing from the spirit or scope thereof and it is to be understood that the invention is limited only as defined in the appended claims.

The present application is a continuation-in-part of prior copending application Serial No. 346,278, filed April 1, 1953, now abandoned.

We claim:

1. A process for the production of a non-gelled interpolymer of a styrene compound selected from the group consisting of styrene and substitution products thereof with a compound selected from the group consisting of drying oils and drying oil fatty acid modified to include at least 10% by weight of an epoxy resin comprising heat-reacting at elevated temperature and in the liquid phase from 40 to 85% by weight of said interpolymer with from 15 to 60% by weight of said epoxy resin, and continuing said heat-reaction until at least 10% by weight of said epoxy resin has been combined with said interpolymer.

2. A process as recited in claim 1 in which said epoxy resin is a polyglycidyl ether of a polyol phenol.

3. A process as recited in claim 1 in which said reaction is carried out at a temperature of about 500° F.

4. A process for the production of a non-gelled interpolymer of a styrene compound selected from the group consisting of styrene and substitution products thereof with a compound selected from the group consisting of drying oils and drying oil fatty acid modified to include at least 10% by weight of an epoxy resin comprising heat-reacting at elevated temperature and in the liquid phase from 40 to 85% by weight of said interpolymer with from 15 to 60% by weight of a polyglycidyl ether of a polyol phenol and continuing said heat-reaction until the acid value of the product is less than about 40.

5. A process as recited in claim 4 in which said polyglycidyl ether has a hydroxyl value of at least about 0.32 equivalents per 100 grams of resin.

6. A process for the production of a non-gelled interpolymer of a styrene compound selected from the group consisting of styrene and substitution products thereof with a compound selected from the group consisting of drying oils and drying oil fatty acid modified to include at least 10% by weight of an epoxy resin comprising interpolymerizing from 25 to 35 parts of said styrene compound with from 35 to 45 parts of said drying oil compound, heat-reacting the interpolymer so produced at elevated temperature and in the liquid phase with at least 15 parts by weight of said epoxy resin and continuing said heat-reaction until at least 10% by weight of said epoxy resin has been combined with said interpolymer.

7. A process as recited in claim 6 in which from 20 to 30 parts by weight of said epoxy resin is reacted with said interpolymer at a temperature of about 500° F.

8. A resinous reaction product formed by heat-reacting at elevated temperature and in the liquid phase from 40 to 85 percent by weight of a non-gelled interpolymer of a styrene compound selected from the group consisting of styrene and substitution products thereof with a compound selected from the group consisting of drying oils and drying oil fatty acid with from 15 to 60 percent by weight of an epoxy resin until the acid value of the product is less than about 40.

9. A resinous reaction product as recited in claim 8 in which said epoxy resin is a polyglycidyl ether of a polyol phenol.

10. A resinous reaction product formed by interpolymerizing from 25 to 35 parts of a styrene compound selected from the group consisting of styrene and substitution products thereof with from 35 to 45 parts of a compound selected from the group consisting of drying oils and drying oil fatty acid, heat-reacting the interpolymer so produced at elevated temperature and in the liquid phase with at least 15 parts by weight of a polyglycidyl ether having an hydroxyl value of at least about 0.32 equivalents per 100 grams of resin, said heat-reaction being continued to provide a product having an acid value of less than about 40.

11. A resinous reaction product formed by heat-reacting at elevated temperature and in the liquid phase from 40 to 85 percent by weight of a non-gelled interpolymer of styrene with a drying oil fatty acid with from 15 to 60 percent by weight of polyglycidyl ether of a polyol phenol until the acid value of the product is less than about 40.

References Cited in the file of this patent

UNITED STATES PATENTS 2,596,737   Tess et al. _____ May 13, 1952

OTHER REFERENCES

Jungnickel et al.: "Organic Analysis," vol. 1 (1953), pages 127 and 128.